United States Patent [19]

Kang

[11] Patent Number: 5,146,451

[45] Date of Patent: Sep. 8, 1992

[54] COMPACT DISK PLAYER WITH TWO STACKED, ROTARY, ROTATIONALLY OFFSET CARRYING PLATES FOR PLURAL DISKS

[75] Inventor: Sin W. Kang, Pusan, Rep. of Korea

[73] Assignee: Samsung Electronics Co., Ltd., Suweon, Rep. of Korea

[21] Appl. No.: 633,525

[22] Filed: Dec. 31, 1990

[30] Foreign Application Priority Data

Dec. 30, 1989 [KR] Rep. of Korea .................... 89-20591

[51] Int. Cl.$^5$ .................... G11B 23/00; G11B 25/00; G11B 17/22; G11B 17/04
[52] U.S. Cl. .................... 369/270; 369/37; 369/178; 360/105
[58] Field of Search .................... 369/270, 271, 37, 38, 369/39, 75.1, 75.2, 77.1, 77.2

[56] References Cited

U.S. PATENT DOCUMENTS 4,670,866  6/1987  Hasegawa et al. ............. 369/37 X
4,755,978  7/1988  Takizawa et al. ............. 369/37

FOREIGN PATENT DOCUMENTS 0239375  10/1987  Japan .................... 369/258

*Primary Examiner*—John W. Shepperd
*Assistant Examiner*—Michael C. Kessell
*Attorney, Agent, or Firm*—Cushman, Darby & Cushman

[57] ABSTRACT

A compact disk player wherein more compact disks can be loaded within a limited space and can be reproduced continuously. A disk setting device on which the disks are placed is arranged as an up-and-down double structure. The disks laid on the disk setting device are lifted-up and lowered in conformity with the heights of a disk chuck, a disk clamp and a pick-up driving part, and also compensated for by a height compensating device for compensating for the difference in height of the disk setting device in order to accomplish the proper chucking of the disks and reproduction of material recorded on the disks.

5 Claims, 4 Drawing Sheets

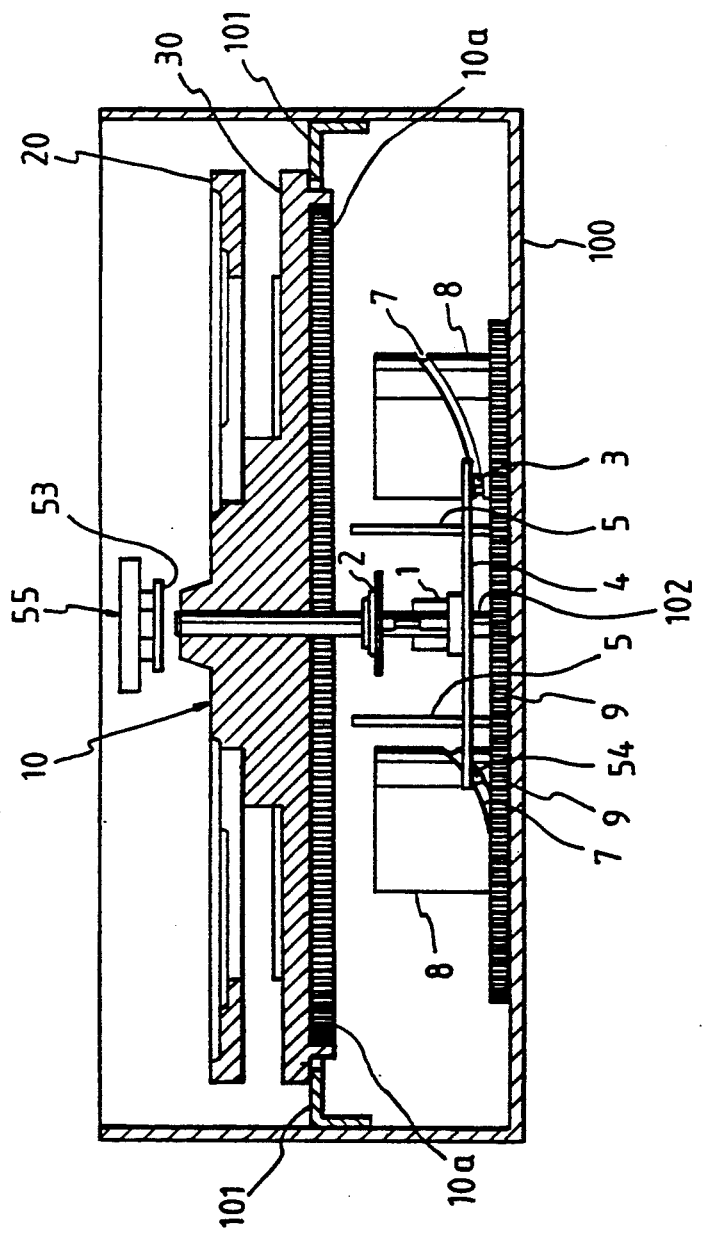

COMPACT DISK PLAYER WITH TWO STACKED, ROTARY, ROTATIONALLY OFFSET CARRYING PLATES FOR PLURAL DISKS

BACKGROUND OF THE INVENTION

This invention relates to a compact disk player, and more particularly, to a compact disk player wherein a plurality of disks can be received in a double-stacked fashion and matter recorded on the disks can be reproduced continuously.

In conventional compact disk players, in order to operate a plurality of disks, there are provided doors and pick-up driving parts for receiving and reproducing each disk in at least two locations, the disks being laid on one circular plate member having a roulette wheel shape.

However, as to those compact disk players, because of there being as many doors and pick-up driving parts as the number of disk-receiving parts for receiving the disks therein, there have been problems, such as there needing to be a larger bulk volume of the apparatus, a moro complicated structure, a greater production price, and consequently an inferior competitiveness in commercial market.

Accordingly, in order to solve the above problems, it has previously been proposed to provide five or six disks set on the plane of a disk laying-on table in a radial arrangement, and a chucking part and a pick-up driving part fixedly provided at predetermined positions on the disk table and at one side of the disk laying-on table respectively, in order to operate the disk which is required to be reproduced selectively.

Nevertheless, in such an apparatus, because the chucking part and the pick-up driving part are also fixedly provided with the plurality of disks being loaded on a horizontal plane, and the disks laid-on the disk laying-on table are to be reproduced by the deck being operated to move up and down, there have continued to exist such disadvantages that at most only five or six of disks can be set therein. If more disks are to be set, the size of the apparatus must be larger, and it is in possible to mount further more disks in such a limited space.

SUMMARY OF THE INVENTION

A primary object of the present invention is to provide a compact disk player in which more disks can be mounted in limited space and reproduced continuously by arranging disk setting means in a double-stacked fashion, which have different levels in height and are crossed.

Another object of the present invention is to provide a compact disk player in which the disks can be chucked by moving vertically a deck bracket and a disk clamp by use of a single driving motor in a simple construction.

In order to accomplish the above objects, there is provided a compact disk player for chucking a plurality of disks and then reproducing signals from the disks. This compact disk player includes a disk setting means for setting plurality of disks. The disk setting means is arranged in a double structure which is separated into an upper setting plate member and a lower setting plate member. The compact disk player also includes transferring means having a cam groove and a gear portion. The transferring means is provided to vertically guide the disk chuck for chucking the disks set on the upper and lower setting plate members of the disk setting means. The compact disk player further includes lifting-up and lowering means provided with a disk clamp for chucking the disks in cooperation with the disk chuck, and a pick-up driving part for operating to lift-up and lower a deck bracket provided with lugs at both sides of the lower section thereof. The compact disk player also includes power transmitting means for operating the transferring means and the lifting-up and lowering means with driving power transmitted from a motor.

BRIEF DESCRIPTION OF THE DRAWINGS

These and other objects, features, and advantages of the present invention will become more apparent from the following description of the preferred embodiments taken in conjunction with the accompanying drawings, in which:

FIG. 3 is a side view in vertical section of the compact disk player.

DETAILED DESCRIPTION OF THE EMBODIMENTS

Figure 1:
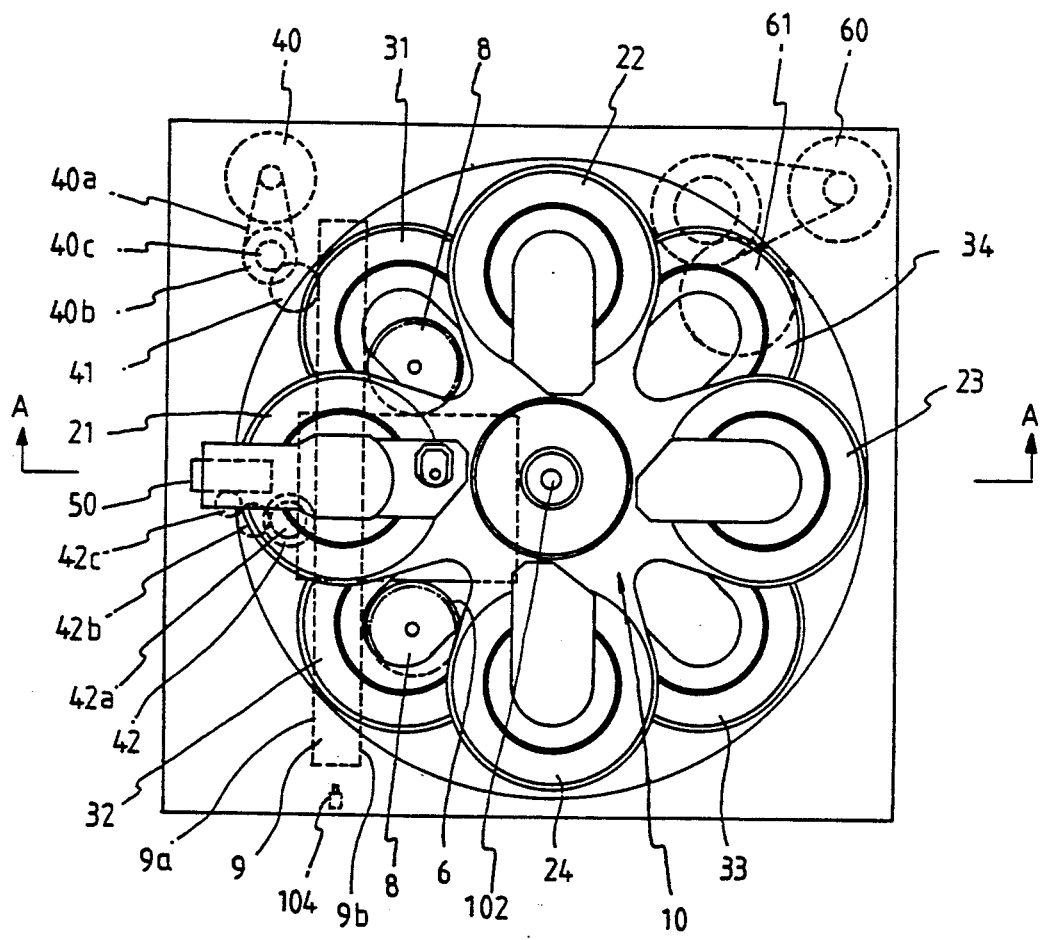
FIG. 1 is a schematic plan view of a compact disk player according to the present invention.
Figure 2:
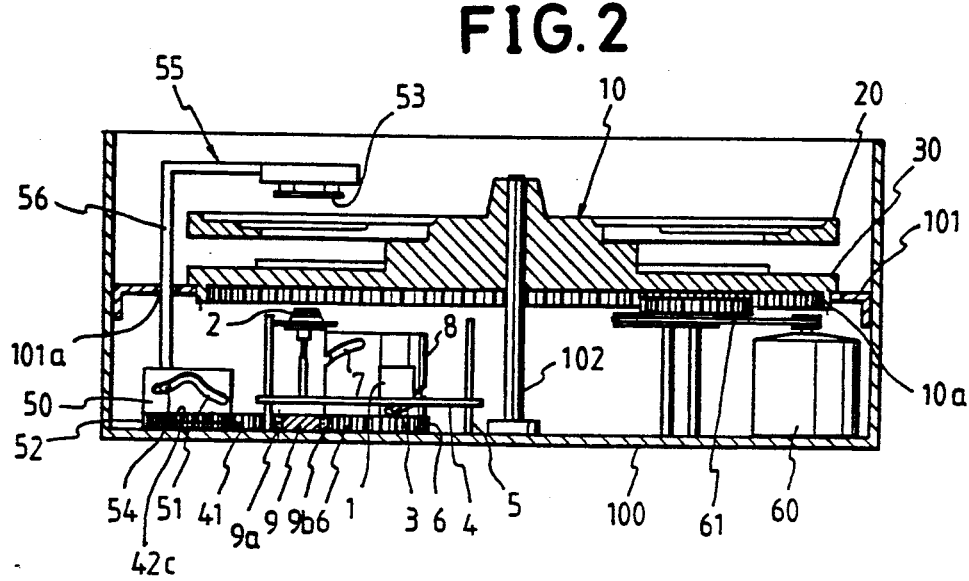
FIG. 2 is a sectional view taken along the line A—A of FIG. 1.
Figure 4A:
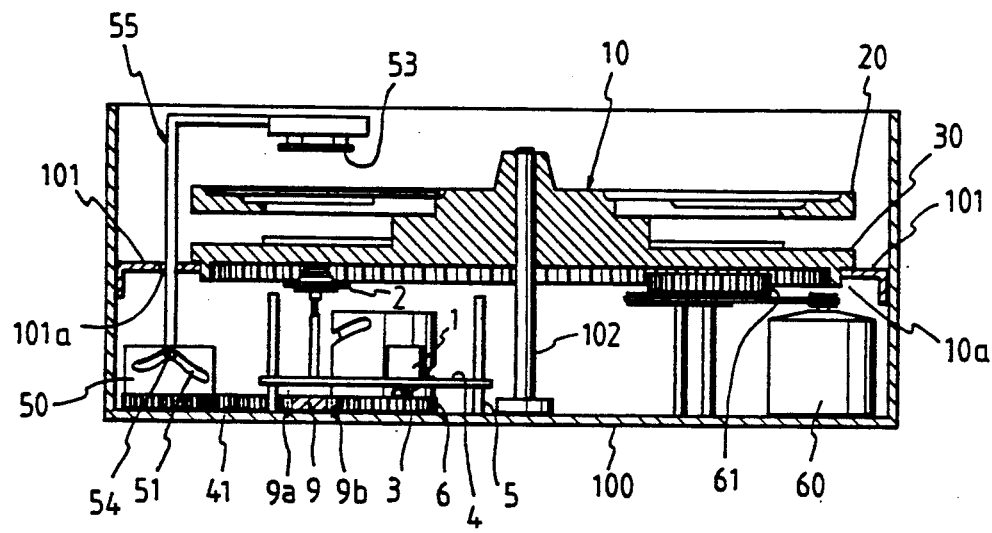
FIGS. 4(A) and 4(B) show the operating states of the compact disk player, with the upper level-positioned disk being chucked.
Figure 4B:
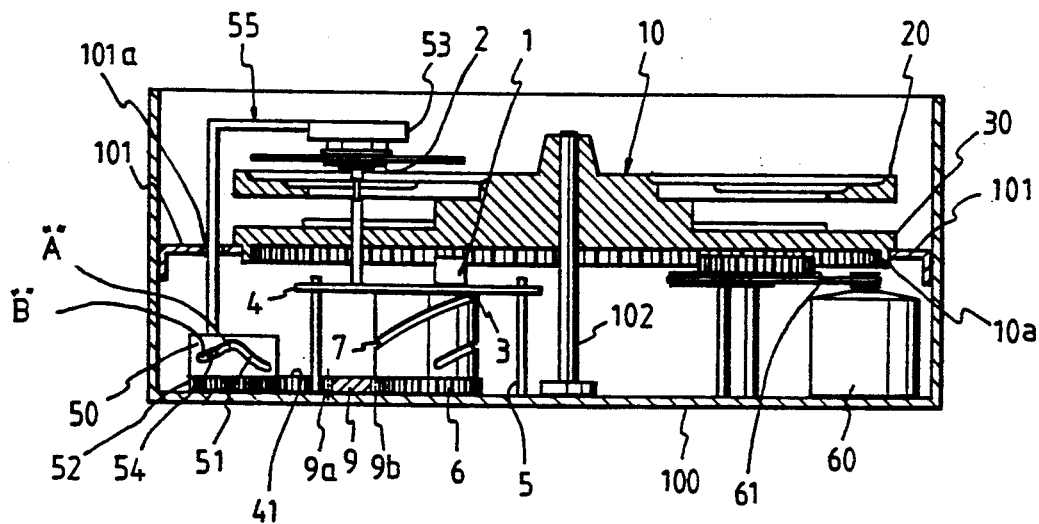
Figure 5A:
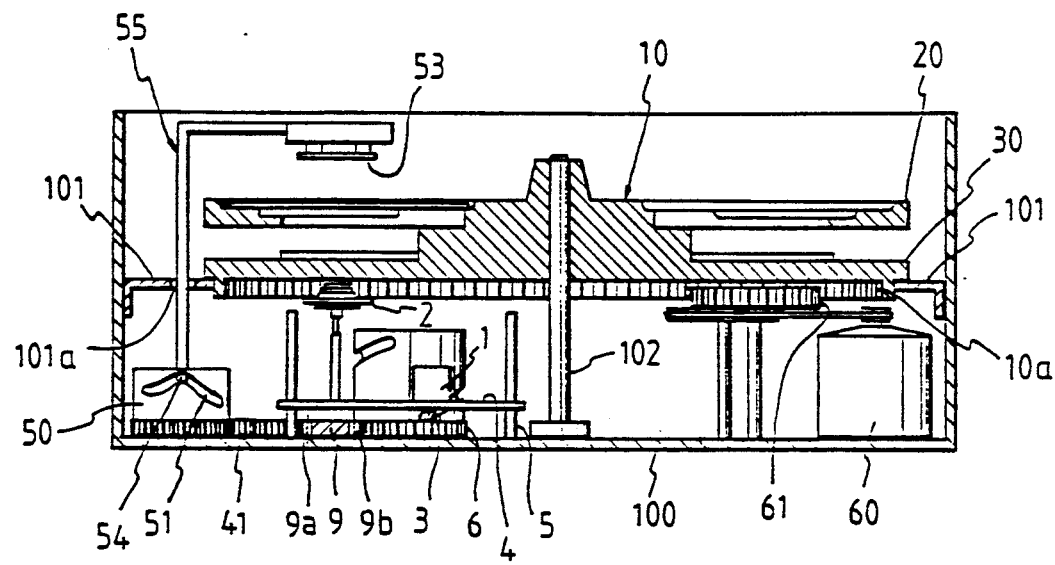
FIGS. 5(A) and 5(B) show the other operating states of the compact disk player, with the lower level-positioned disk being chucked.
Figure 5B:
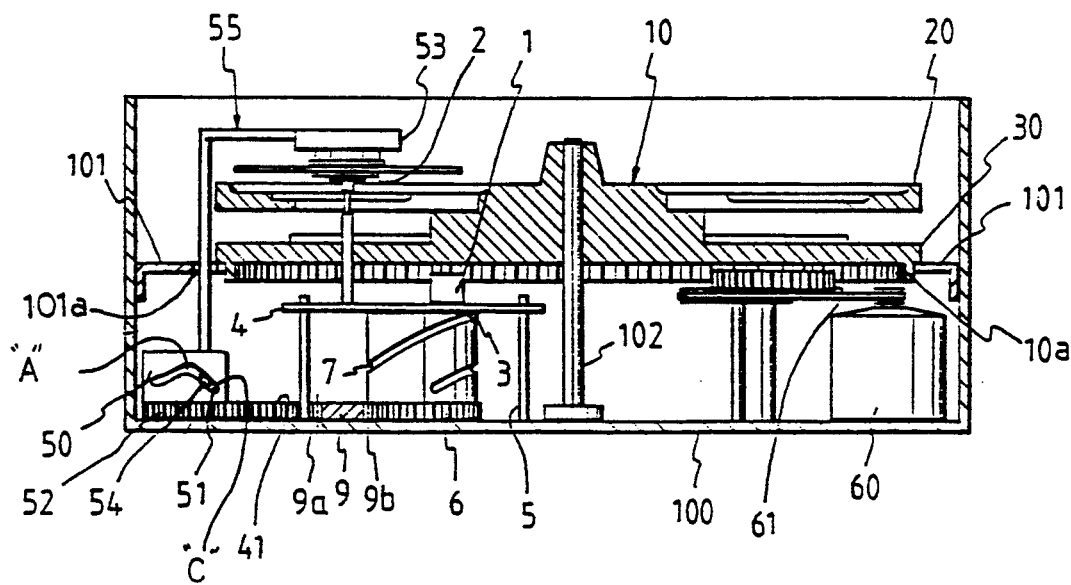

Referring to the compact disk player as shown in FIGS. 1 and 2, at the center of a disk table 101 arranged within a case 100 of the compact disk player, disk setting means 10 are provided on which plural compact disks are set. The disk setting means 10 is rotatably connected with a shaft 102. The disk setting means 10 is separated into an upper setting plate member 20, and a lower setting plate member 30.

The upper and lower setting plate members are vertically spaced from each other a predetermined distance. On each of the upper and lower disk setting plate members 20 and 30, four disk setting parts 21 to 24 and 31 to 34 are formed to enable a total of eight compact disks, 4 compact disks per each disk setting plate member to be set thereon.

At the upper portion of the lower end of the disk table 101, a pick-up driving part 1 for reproducing signals from the disks laid on the upper and lower setting plate members 20 and 30, and a clamp 2 for chucking the disks are disposed, and a deck bracket 4 on which lugs 3 protrude at both sides thereof, is disposed to be guided by a guide rod 5 and to be lifted-up and lowered.

Further, on the bottom of both sides of the case 100 of the deck bracket 4, a cylindrical cam 8 which is provided with a spiral-shaped groove 7 on the peripheral surface thereof and a gear portion 6 at the distal portion thereof, with the lugs 3 of the deck bracket 4 being engagedly inserted into respective ones of the cylindrical cams 8.

On the bottom of the lower side of the case 100 of the deck bracket 4, a rack gear 9 provided with gear portions 9a and 9b at both sides thereof is disposed. The gear portion 8b in one side of the rack gear 9 is arranged to engage with the gear portions 5 of both cylindrical cams 8, and the gear portion 9a in the other side of the rack gear 9 is arranged to engage with a gear 41 driven by a motor 40 and a reduction gear 42.

At one side of the reduction gear 42, transferring means 50 provided with a gear portion 53 and a cam groove 51 is movably disposed toward a lateral side, the gear portion 52 being engaged with reduction gears 42b and 42c, which are rotated with the reduced speed by the reduction gear 42. At a predetermined position of the disk table 101, the rod portion 56 of the disk chuck 55 is disposed, passing through a guide hole 101a of the disk table 101. The rod portion 56 has a chucking portion 53 for chucking the disk by contact with the disk clamp 2. A lug portion 54 is guidedly inserted into the cam groove 51 at the upper section thereof.

An motor 60 is provided on the other side of the bottom of the case 100, and the disk setting means 10 is rotatably disposed with the engagement between the gear 61 reduced by the motor 60 and the gear portion 10a provided on the internal peripheral surface at the lower side of the disk setting means 10.

The operation of the compact disk player with the above construction according to this invention is described hereinbelow.

First, there is provided a description of the process for setting the compact disks onto the disk setting means 10. The disks are load on the disk setting parts 21 to 24 of the upper setting plate member 20 and then the further disks are also laid on the disk setting parts 31 to 34 of the lower setting plate member 30. At this time, the further disks to be laid on the disk setting parts 31 to 34 are inserted through a gap defined below the space between the disk setting parts 21 to 24 of the upper setting plate member 20.

Thus, upon the completion of settlement of the plural compact disks onto the upper and lower setting plate member 20 and 30, when the user operates to drive the motor 80 disposed at a predetermined position on the bottom of the case 100 in order to locate the disk on target toward the pick-up driving part 1, the position of the disk required by the user and the position of the pick-up driving part 1 are concurred through the rotation of the disk setting means 10. The rotation is effected by the transmission of rotational power of the motor 60 through the gear portion 10a on the internal peripheral surface at the lower side of the disk setting means 10 and the gear 51 the teeth of which are meshed therewith.

After that, the rotation of the motor 60 is stopped and the disk selected by the user is driven for reproduction. When the selected disk may be laid on the upper setting plate member 20, as shown FIGS. 1, 2, 4A and 4B, the motor 40 for driving the rack gear 9 is operated, and then the rotational power of the motor 40 is transmitted to the gear 41 through a belt 40a, a pulley 40b and a pulley 40c. Thus, as the rotational power is transmitted to the gear 41, the rack gear 9 which is tooth-engaged with the gear 41 is linearly moved to rotate the reduction gear 42 and the cylindrical cam 8 which allow the transferring means 50 to move.

As described above, once both cylindrical cams 8 are rotated due to the tooth-engagement relationship between the gear portions 6 at the ends of both cylindrical cams 8 and the gear 9b of the rack gear 9, then the lug 3 of the deck bracket 4, which is engagedly inserted into the spiral shaped groove 7 formed on the external peripheral surface of the cylindrical cam 8, is intended to be lifted-up with the guidance of the groove 7. Because the lugs are fixed at both sides of the deck bracket 4 and the deck bracket 4 is disposed to be lifted-up and lowered by the guide rod 5, the lifting-up movement is completed by the rotational movement of the cylindrical cam 8.

At the same time, the reduction gear 42, which is tooth-engaged with the gear portion 9a of the rack gear 9, is simultaneously rotated. The transferring means 50 is thus linearly moved by the transmission of the rotational power of the reduction gear 42 through the respective reduction gears 42a, 42b and 42c.

In response to the linear movement of the transferring means 50, a lug portion 54 at the end of the disk chuck 55, which is located at the upper high point "A" portion of the cam groove 51 of the transferring means 50, is guidedly lowered to the "B" portion of the cam groove 51. The disk chuck 55 is lowered toward the disk clamp 2 by an amount which corresponds to the distance which the lug portion 54 has travelled, and the disk clamp 2 is lifted-up simultaneously with the lifting-up of the deck bracket 4.

The chucking of the selected disk laid-on the disk setting parts 21 to 24 of the upper setting plate member 20 is thus effected by the mutual contact of the disk chuck 55 and the disk clamp 2.

With the above mentioned operations, the disk is chucked between the chucking part 53 and the disk clamp 2. Thus, the signals from the disk are reproduced by the pick-up driving part 1 provided on the disk clamp 2 and the deck bracket 4. Upon the completion of the reproduction of the disk, the returning operation may be performed with the reverse sequences to those for the chucking process. The motor 40 is rotated in the reverse direction and the rack gear 9 is then linearly moved. Thus, the cylindrical cam 8 is rotated to lower the deck bracket 4. When the deck bracket 4 is lowered to a predetermined level in height, actuation of a microswitch 104 shuts off the electric power.

In order to operate the disk laid on the lower setting plate member 30 for reproducing the disk, as shown in FIGS. 1, 2, 5A and 5B, a disk setting means 10 is rotated by the motor 60 and then stopped at the predetermined position according to the program stored within the micro-computer of the on-board circuit.

As the motor 40 is rotated, the rack gear 9 receiving the rotational power of the motor is linearly moved, the cylindrical cam 8 which is tooth-engaged with the rack gear 9 is then rotated. Due to the operation of the lug 3 inserted into the spiral groove 7 of the cylindrical cam 8, the deck bracket 4 is lifted-up with the guidance of the guide rod 5.

The reduction gear 42, which is tooth-engaged with the gear portion 9a of the rack gear 9, is rotated, and the transferring means 50 is thus moved by the transmission of the rotational power of the reduction gear 42 through the respective reduction gears 42a, 42b and 42c, and then the disk chuck 55 is moved lowered. At this time, because the displacement amount of the transferring means 50 is less at the predetermined height than in the operation for chucking the upper lever-positioned disks, the disks set on the lower setting plate member 30 can be also chucked.

Upon the completion of the reproduction of the disk, the motor 40 is rotated in the reverse direction and the rack gear 9 is then linearly moved. Thus, the cylindrical cam 8 is rotated to lower the deck bracket 4. When the deck bracket 4 is lowered to a predetermined height, actuation of the microswitch 104 shuts off the electric power.

Using the device of the present invention, more compact disks can be mounted in limited space by arranging the disk setting means in a double-stacked fashion, which have different levels in height and are crossed, and the disks can be chucked by a single construction including one driving motor, for continuously reproducing the disks.

As is apparent, in the embodiment depicted, the upper disk-setting plate has four compact disk support sites disposed in a horizontal plane about a vertical axis, with vertical gaps rotationally interspersed therebetween. The lower disk-setting plate has a corresponding layout, but the two plates are rotationally offset (as best seen in FIG. 1), by an angular distance equal to one-half the angular distance between two neighboring compact disk support sites on a same plate. Accordingly, when any compact disk support site is centered on the compact disk playing axis (located at the 9 o'clock position in FIG. 1), the disk chuck and disk clamp which are centered on this axis can access a respective disk supported on one plate, through a respective gap in the other plate.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims cover any such modifications or embodiments as fall within the true scope of the invention.

What is claimed is:

1. A compact disk player, for selectively playing any one of a plurality of compact disks simultaneous disposed therein, said compact disk player comprising:
a case;
a disk-setting means comprising an upper disk-setting plate coaxially superimposed upon a lower disk-setting plate with vertical spacing therebetween each said disk-setting plate being generally horizontally arranged at a respective level and having provided thereon, as viewed in plan, a plurality of compact disk support sites separated by regularly alternating vertical gaps, circumferentially of the respective said disk-setting plate; said lower disk-setting plate being arranged to be rotationally offset relative to said upper disk-setting plate, so that, as viewed in plan, each disk support site on said upper disk-setting plate is exposed from below through a respective said gap of said lower disk-setting plate and each disk support site on said lower disk-setting plate is exposed from above through a respective said gap of said upper disk-setting plate; and
means mounting said disk-setting plates with respect to said case for coordinated rotation about a vertical axis located centrally of said disk-setting plates so as to dispose said disk-setting plates with said lower disk-setting plate rotationally offset relative to said upper disk-setting plate;
a disk reading means mounted in said case for reading a selected compact disk when said selected compact disk is disposed at a respective one of either of two disk-reading sites, which sites are disposed in vertical alignment with one another on a disk playing axis, one such site being associated with said upper disk-setting plate and another such site being associated with said lower disk setting plate; and
a disk chuck and a disk clamp mounted in said case so as to both be effectively centered in use on said disk playing axis, by respective means for coordinately moving and disposing said disk chuck and said disk clamp into each of three sets of positions, including:
a first set of positions, in which said disk chuck and disk clamp are withdrawn so as to be removed from interference with rotation of said upper and lower disk-setting plates about said vertical axis so as to dispose a selected compact disk support site on a respective said disk-setting plate centered on said disk playing axis,
a second set of positions, in which said disk chuck and said disk clamp vertically temporarily displace a selected compact disk centered on said disk playing axis, from said upper disk-setting plate, to said one disk-reading site, and
a third set of positions, in which said disk chuck and said disk clamp vertically temporarily displace a selected compact disk centered on said disk-playing axis, from said lower disk-setting plate, to said other disk-reading site.

2. The compact disk player of claim 1, wherein:
said disk-setting means further includes means for rotating said upper and lower disk-setting plates while coordinating said upper and lower disk setting plates so that, in use, said upper and lower disk-setting plates are offset, through each of a selected number of angular increments, which number is equal to the total number of all said compact disk support sites.

3. The compact disk player of claim 2, wherein:
said total number of compact disk support sites is eight, there being four of said compact support sites and four of said vertical gaps provided on each of said disk-setting plates.

4. The compact disk player of claim 2, wherein:
said disk-setting means includes an electric motor; and
mechanical means effectively connecting said electric motor with said upper and lower disk-setting plates for rotating said upper and lower disk-setting plates; and
said compact disk player further includes mechanical means effectively connecting said motor with said disk chuck and said disk clamp for selectively coordinately moving said disk chuck and said disk clamp to each of said three sets of positions.

5. The compact disk player of claim 4 wherein:
said means for reading a selected compact disk are mounted to said case by means for selectively moving said reading means to two vertically spaced positions for juxtaposition respectively with said two disk-reading sites; and
said compact disk player further includes mechanical means effectively connecting said motor with said means for selectively moving said reading means, for moving said reading means selectively into juxtaposition with said two disk-reading sites.

* * * * *